(12) United States Patent
Seel et al.

(10) Patent No.: US 11,151,314 B2
(45) Date of Patent: Oct. 19, 2021

(54) EXTENSIBLE GRID LAYOUT

(71) Applicant: SAP SE, Walldorf (DE)

(72) Inventors: Carolin Seel, Heidelberg (DE);
Jan-Michel Blinn, Osthofen (DE);
Roman Rommel, Neustadt an der Weinstrasse (DE)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 16/165,481

(22) Filed: Oct. 19, 2018

(65) Prior Publication Data

US 2020/0125631 A1 Apr. 23, 2020

(51) Int. Cl.
*G06F 40/186* (2020.01)
*G06F 40/14* (2020.01)
*G06F 40/106* (2020.01)

(52) U.S. Cl.
CPC .......... *G06F 40/186* (2020.01); *G06F 40/106* (2020.01); *G06F 40/14* (2020.01)

(58) Field of Classification Search
CPC ............................. G06F 40/106; G06F 40/186
See application file for complete search history.

(56) References Cited

U.S. PATENT DOCUMENTS

| | | | | |
|---|---|---|---|---|
| 7,900,137 B2* | 3/2011 | Ivarsoy | ............... | G06F 16/9577 715/238 |
| 8,438,495 B1* | 5/2013 | Gilra | ...................... | G06F 40/14 715/781 |
| 9,158,743 B1* | 10/2015 | Kraemer | ................... | G06F 8/38 |
| 9,548,042 B2* | 1/2017 | Shekey | .................... | G09G 5/14 |
| 9,817,794 B2* | 11/2017 | Marseille | .............. | G06F 40/106 |
| 9,857,959 B2* | 1/2018 | Dhawal | .................. | G06F 40/186 |
| 2005/0055635 A1* | 3/2005 | Bargeron | ............. | G06F 40/103 715/251 |
| 2006/0242557 A1* | 10/2006 | Nortis, III | ............. | G06F 40/177 715/234 |
| 2008/0201118 A1* | 8/2008 | Luo | ....................... | G06F 16/958 703/2 |

(Continued)

OTHER PUBLICATIONS

W3C, editor Tad Atkins, "CSS Grid Layout"; https://www.w3.org/TR/css-grid-1/; Dec. 14, 2017; 107 pages (Year: 2017).*

(Continued)

*Primary Examiner* — Scott T Baderman
*Assistant Examiner* — Benjamin Smith
(74) *Attorney, Agent, or Firm* — Sterne, Kessler, Goldstein & Fox P.L.L.C.

(57) ABSTRACT

Disclosed herein are system, method, and computer program product embodiments for adding a template engine to a Cascading Style Sheets (CSS) grid layout to display content using different templates. An embodiment operates by generating a grid layout component based on a template. The generated grid layout component defines a layout type based on a cascading style sheet (CSS) grid layout. The embodiment generates a grid component comprising a set of grid cell components based on a view file. Each grid cell component represents a grid cell in the CSS grid layout, and each grid cell component is mapped to one or more rows and one or more columns in the CSS grid layout. The embodiment then displays content of the set of grid cell components using the layout type.

20 Claims, 5 Drawing Sheets

(56) References Cited

U.S. PATENT DOCUMENTS

| | | | |
|---|---|---|---|
| 2010/0031167 A1* | 2/2010 | Roytman | G06F 16/972 715/760 |
| 2012/0179987 A1* | 7/2012 | Mohan | G06F 8/38 715/762 |
| 2013/0219024 A1* | 8/2013 | Flack | H04L 67/02 709/219 |
| 2013/0222423 A1* | 8/2013 | Fields | G06T 19/20 345/629 |
| 2013/0326343 A1* | 12/2013 | Phillips | G06F 16/9577 715/252 |
| 2014/0006936 A1* | 1/2014 | Shekey | G09G 5/14 715/252 |
| 2014/0047413 A1* | 2/2014 | Sheive | H04L 65/403 717/110 |
| 2014/0096012 A1* | 4/2014 | Grosz | H04L 67/16 715/733 |
| 2015/0106751 A1* | 4/2015 | Farjo | G06F 16/972 715/760 |
| 2015/0254732 A1* | 9/2015 | Snyder | G06Q 30/0277 705/14.72 |
| 2016/0026730 A1* | 1/2016 | Hasan | G06F 40/18 715/234 |
| 2016/0062584 A1* | 3/2016 | Cohen | G06F 3/0485 715/784 |
| 2016/0078006 A1* | 3/2016 | Straub | H04L 67/02 715/235 |
| 2016/0162448 A1* | 6/2016 | Wang | G06F 40/154 715/236 |
| 2017/0031574 A1* | 2/2017 | Dhawal | G06F 40/14 |
| 2017/0091152 A1* | 3/2017 | Antipa | G06F 40/106 |
| 2017/0102927 A1* | 4/2017 | Gunther, Jr. | G06F 3/0482 |
| 2017/0139874 A1* | 5/2017 | Chin | G06F 40/177 |
| 2018/0024701 A1* | 1/2018 | Sanches | G06F 40/14 715/781 |

OTHER PUBLICATIONS

The CoffeeCup Guide to Liberating Layout Through CSS Grid, https://cssgrid.cc/css-grid-guide.html, https://web.archive.org/web/20180903142631/https://cssgrid.cc/css-grid-guide.html, (Year: 2018).*

Ahmed Abuelgasim (Netmag); A comprehensive guide to using CSS Grid; Oct. 2, 2018, https://www.creativebloq.com/advice/a-comprehensive-guide-to-using-css-grid (Year: 2018).*

W3Schools; "CSS Grid Layout Module"; https://www.w3schools.com/css/css_grid.asp; page archived on Aug. 29, 2018 and retrieved from the Wayback Maching on Aug. 20, 2020; https://web.archive.org/web/20180829194246/https://www.w3schools.com/css/css_grid.asp (Year: 2018).*

Tab Atkins Jr. et al. editors; W3C, "CSS Grid Layout Module Level 2"; Aug. 4, 2018; https://www.w3.org/TR/2018/WD-css-grid-2-20180804/; (Year: 2018).*

Rachel Andrew, Smashing Magazine, "Best Practices With CSS Grid Layout",Apr. 16, 2018; 14 pages; https://www.smashingmagazine.com/2018/04/best-practices-grid-layout/ (Year: 2018).*

Mozilla MDN Web Docs; "Realizing common layouts using CSS Grid Layout"; Nov. 28, 2017; 20 pages; retrieved from WayBack Machine on Dec. 15, 2020, https://web.archive.org/web/20171128075332/https://developer.mozilla.org/en-US/docs/Web/CSS/CSS_Grid_Layout/Realizing_common_layouts_using_CSS_Grid_Layout (Year: 2017).*

* cited by examiner

EXTENSIBLE GRID LAYOUT

BACKGROUND

A web-based application can use different layout types to present information. Currently, a web-based application may use different layout modules for different layout types. For example, a web-based application can use a horizontal layout module, vertical layout module, 12 column grid layout module, dynamic slide content layout module, or Cascading Style Sheet (CSS) FlexBox layout module for a given layout type. But maintaining different layout modules for different layout types is expensive and error prone. A web-based application may also use a layout type that has requirements that cannot be fulfilled using an existing layout module. But additional functionality may not be able to be added to the existing layout module without increasing page load time and decreasing responsiveness for layout types that do not need this additional functionality. A web-based application may also provide predefined templates for different layout types. But these predefined templates often cannot be easily shared with third-party developers. Finally, a web-based application may use a layout type that does not allow responsiveness on an element level without decreasing performance.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for adding a template engine to a Cascading Style Sheets (CSS) grid layout module to display content using different templates.

A CSS grid layout can be a layout module of the CSS standard. A CSS grid layout module can also be referred to as a CSS grid layout. A CSS grid layout can be applied to a page of a web-application, or a container element of the page. A CSS grid layout can define a grid for the page or the container element of the page. The grid can include one or more rows and one or more columns. A page, or a container element of the page, having a CSS grid layout can be referred as a grid container.

Page elements can be inserted into the grid. A page element inserted into the grid can be referred to as a grid item or grid cell. A grid cell can be assigned a location and size in the grid. For example, the grid cell can be defined to start at a first row and end at a second row in the grid. The grid cell can be further defined to start at a first column and end at a second column in the grid. Thus, the grid cell can be defined to span multiple columns and or rows. A grid cell can also be a container element and therefore a grid container.

A CSS grid layout can provide several advantages over other layout modules. First, a CSS grid layout can be used to implement a variety of different layout types. For example, a two column layout, a three column layout, or a masonry layout can be implemented on top of the CSS grid layout. Second, a web browser can adjust cells in the CSS grid layout without the overhead of JavaScript.

But conventional approaches using a CSS grid layout do provide element level responsiveness. This is because the CSS grid layout does not provide a way to independently address grid cells within it. Embodiments herein solve this technological problem by linking each grid cell in the CSS grid layout to a corresponding grid cell component. The grid cell component can maintain size and position information about the corresponding grid cell. The grid cell component can also be dynamically linked to an event handler in an add-on component. This enables element level responsiveness for the corresponding grid cell.

In addition, conventional layout approaches often use predefined templates for different layout types. These predefined templates may combine a layout module with specific layout attributes and functionality to define a particular layout type. But these predefined templates cannot be easily shared with or modified by third-party developers. Moreover, it is often expensive to maintain these predefined templates.

Embodiments herein solve this technological problem by adding a template engine on top of a CSS grid layout that dynamically generates different layout types based on independently developed templates. By adding the template engine on top of a CSS grid layout, a common framework can be used to generate different layout types without having to modify the template engine itself. This can make it possible to use the CSS grid layout in a declarative way as a web component. A third-party developer can generate a particular layout type by merely providing a corresponding template to the template engine. The template can override attributes and functionality of the common framework. The template engine 108 can then use the template to generate the particular layout type. Because the template engine is decoupled from the template, a third-party developer can independently develop the template. Moreover, the third-party developer can easily share the template with other developers interested in using the corresponding layout type.

In addition, conventional approaches often do not provide a way to attach additional functionality to a layout type as needed. For example, conventional approaches often attach additional functionality to a layout type even if it is only applicable for a few particular use cases. This often increases load time and decreases responsiveness. In addition, conventional approaches do not provide a way for third-party developers to independently develop such functionality for particular layout types. Embodiments herein solve this technological problem by providing a mechanism that loads such additional functionality for a layout type only when it is necessary. Moreover, embodiments herein provide a mechanism for third-party developers to provide such additional functionality for a particular layout type using independently developed add-on components.

Figure 1:
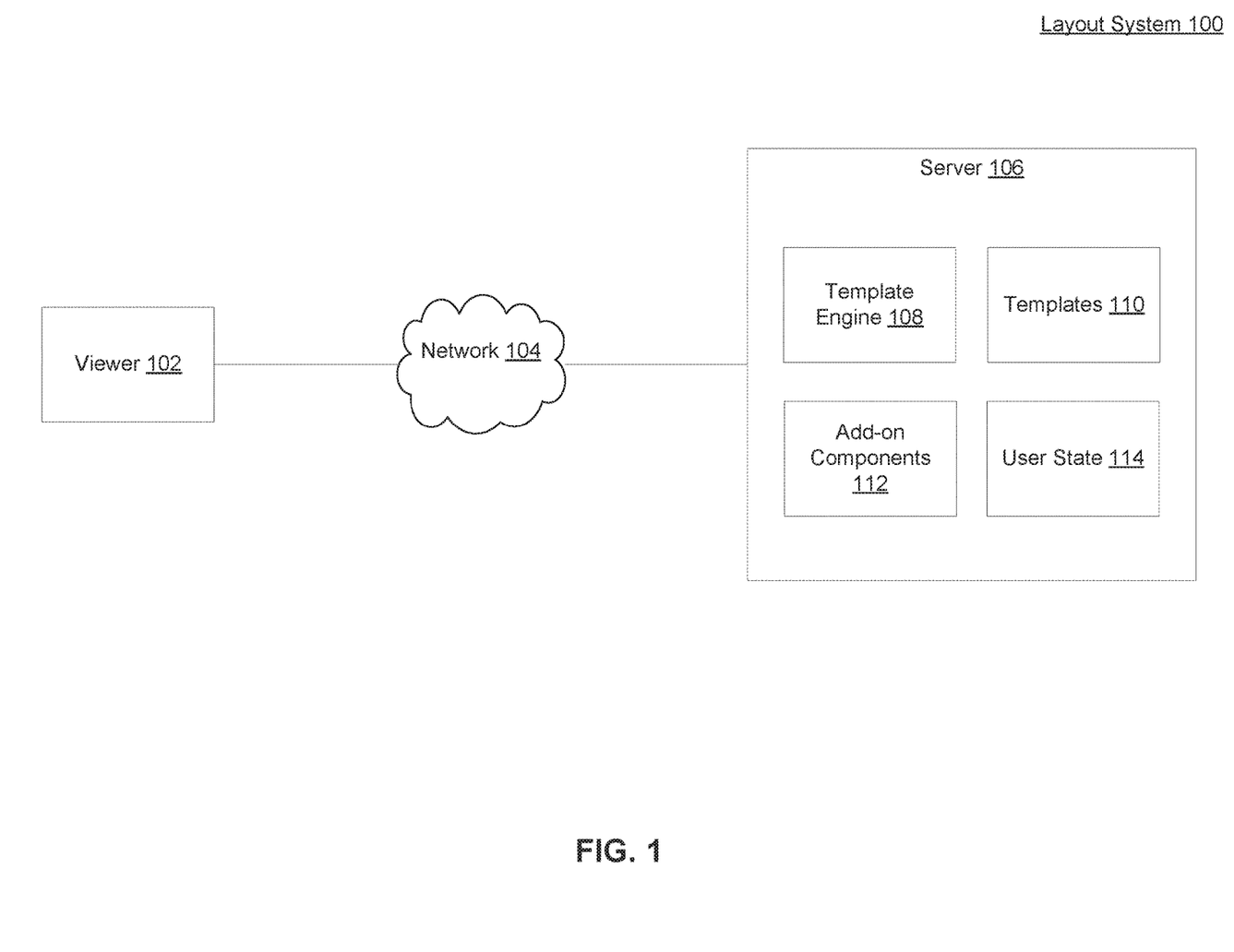
FIG. 1 is a block diagram of a layout system that adds a template engine to a Cascading Style Sheet (CSS) grid layout module to display content using different templates, according to some embodiments.

FIG. 1 is a block diagram of a layout system 100 that adds a template engine to a CSS grid layout module to display content using different templates, according to some embodiments. Layout system 100 can include viewer 102 and server 106.

Viewer 102 can be a web browser such Microsoft Edge, Google Chrome, Mozilla Firefox, or Apple Safari. Server 106 can be an application server. Server 106 can include a template engine 108, one or more templates 110, one or more add-on components 112, and user state 114. Template engine 108 can be an application or system that utilizes a CSS grid layout to display content using one or more templates 110.

Viewer 102 can download template engine 108 from server 106 over network 104. Network 104 can include, without limitation, wired and/or wireless intranet, extranet, Internet, cellular, Bluetooth and/or any other local, short range, ad hoc, regional, global communications network, as well as any combination thereof. Viewer 102 can then use template engine 108 to display content using one or more templates 110.

Template engine 108 can generate a layout type on top of a CSS grid layout using a template 110. For example, template engine 108 can generate a masonry layout, three column layout, or two column layout on top of the CSS grid layout. Template engine 108 can then use the generated layout to display content.

Figure 2:
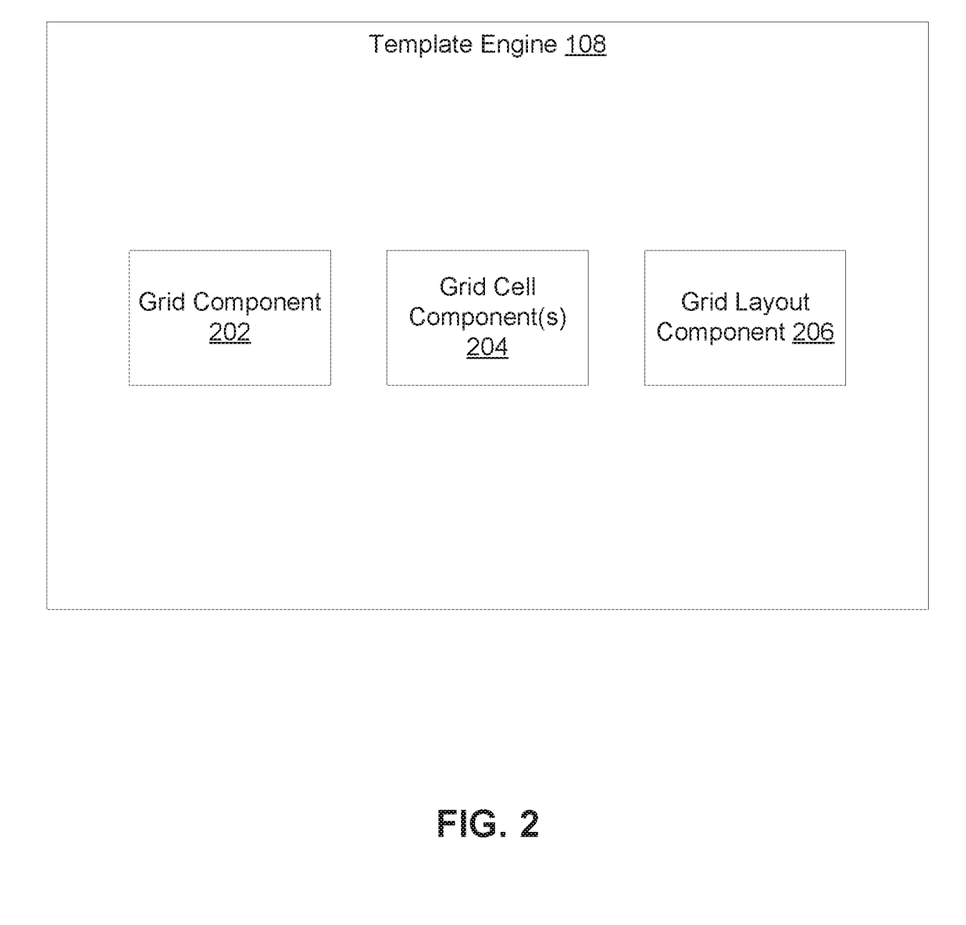
FIG. 2 is a block diagram of a template engine of FIG. 1 that utilizes a CSS grid layout to display content according to one or more templates, according to some embodiments.

FIG. 2 is a block diagram of a template engine 108 that utilizes a CSS grid layout to display content according to one or more templates 110, according to some embodiments. FIG. 2 is discussed with reference to FIG. 1. Template engine 108 can include grid component 202, one or more grid cell components 204, and a grid layout component 206.

As discussed above, viewer 102 can use template engine 108 to display content using different templates 110. This can involve viewer 102 downloading a view file from server 106. The view file can describe how to generate a particular page of a web-based application.

The view file can define one or more page elements of the page. A page element can be an area of the page containing content. For example, the view file can specify that a page includes a header element, a navigation element, and a content area element.

The view file can also specify that a page element contains one or more child page elements. In other words, the view file can specify that the page element is a container element that groups together one or more child page elements for display. For example, the view file can specify that the content area element includes one or more card elements that display a task or topic.

The view file can specify that the page is displayed using a CSS grid layout. In other words, the view file can specify that the page is a grid container. The view file can further specify that the page is displayed using a template 110 based on the CSS grid layout. For example, the view file can specify that the page is displayed using a masonry layout, 3 column layout, or two column layout.

The view file can also specify that a particular page element of the page is displayed using a CSS grid layout. In other words, the view file can specify that the particular page element is a grid container. The view file can also specify that the particular page element of the page is displayed using a template 110 based on a CSS grid layout. For example, the view file can specify that the content area element of the page is displayed using a template 110.

In some embodiments, the view file can specify the size and or position of one or more child page elements (e.g., grid cells) of a page element (e.g., grid container) using a CSS grid layout or a template 110 based on a CSS grid layout. In some other embodiments, the view file may not specify the size and or position of the one or more grid cells. Template engine 108 may then display the grid cells using the CSS grid layout based on their relative order in the view file.

The view file can define a display mode for a template 110 assigned to the page or a page element (e.g., grid container). The display mode can indicate whether to attach one or more add-on components 112 to the page or the page element.

The view file can specify one or more override values for one or more default properties of an assigned template 110. For example, the view file can replace the default grid-row-gap size of a template 110 with a different value.

The view file can also define a custom layout for the page or a page element. For example, instead of assigning a template 110 to the page or a page element, the view file can indicate that the page or the page element uses a CSS grid layout. The view file can then set one or more properties of the CSS grid layout for the page or the page element.

The view file can be written in various data formats as would be appreciated by a person of ordinary skill in the art. For example, the view file can be an extensible markup language (XML) file. This can provide an easy to use interface to specify the one or more page elements of the page and a template 110 to use to display the page and the one or more page elements.

After downloading the view file, viewer 102 can use template engine 108 to parse the view file. Template engine 108 can then generate instances of grid component 202, grid cell component(s) 204, and grid layout component 206 based on the parsed data. Grid component 202, grid cell component(s) 204, and grid layout component 206 can be JavaScript classes, and the instances of grid component 202, grid cell component(s) 204, and grid layout component 206 can be JavaScript objects. However, as would be appreciated by a person of ordinary skill in the art, grid component 202, grid cell component(s) 204, and grid layout component 206 can be written in various other programming languages. It is also possible to use the grid cell component(s) 204 in a declarative way inside Hypertext Markup Language (HTML) as web components.

Grid component 202 can represent a page or page element assigned a CSS grid layout. Grid component 202 can manage one or more child page elements (e.g., grid cells) of the CSS grid layout. Grid component 202 can also attach or detach one or more add-on components 110 to a grid cell. Grid component 202 can also control how to display the grid frame for the CSS grid layout.

During instantiation of grid component 202, template engine 108 can create a grid cell component 204 for each child page element (e.g., grid cell) of the page element assigned the CSS grid layout. Template engine 108 can store each grid cell component 204 in grid component 202. Grid cell component 204 can represent a grid cell within the CSS grid layout. Grid cell component 204 can also control how to display the content of the grid cell. For example, grid cell component 204 can display the content of the grid cell differently based on the position and size of the grid cell.

Grid cell component 204 can store the position of the corresponding grid cell within the CSS grid layout. Grid cell component 204 can store the position of the corresponding grid cell using properties of the CSS grid layout. For example, grid cell component 204 can store the position of the corresponding grid cell using the grid-row-start and grid-column-start properties of CSS.

Grid cell component 204 can also store the size of the corresponding grid cell within the CSS grid layout. Grid cell component 204 can store the size of the corresponding grid cell using properties of the CSS grid layout. For example, grid cell component 204 can store the size of the corresponding grid cell using the grid-row-span and grid-column-span properties of CSS. The grid-row-span property can define the number of rows the child element occupies in the CSS grid layout. The grid-column-span property can define the number of columns the child element occupies in the CSS grid layout. As would be appreciated by a person of ordinary skill in the art, grid cell component 204 can store various other information about its corresponding grid cell.

Grid layout component 206 can layout the one or more grid cells of a page element assigned a CSS grid layout. Grid layout component 206 can provide predefined behavior for the CSS grid layout. Grid layout component 206 can define a default number of rows and columns for the CSS grid layout. Grid layout component 206 can define default spacing between the one or more grid cells in the CSS grid layout.

Grid layout component 206 can also provide responsive behavior. For example, grid layout component 206 can define one or more breakpoints. A breakpoint can define a set of circumstances when content is better displayed using a different layout. For example, a breakpoint can be based on a screen size, screen orientation, or input mechanism of viewer 102. As would be appreciated by a person of ordinary skill in the art, a breakpoint can be based on various other characteristics of viewer 102. Grid layout component 206 can adjust the properties of the CSS grid layout based on viewer 102 satisfying a particular breakpoint. For example, grid layout component 206 can adjust the number of rows and columns for the CSS grid layout based on viewer 102 satisfying a particular breakpoint.

Figure 3A:
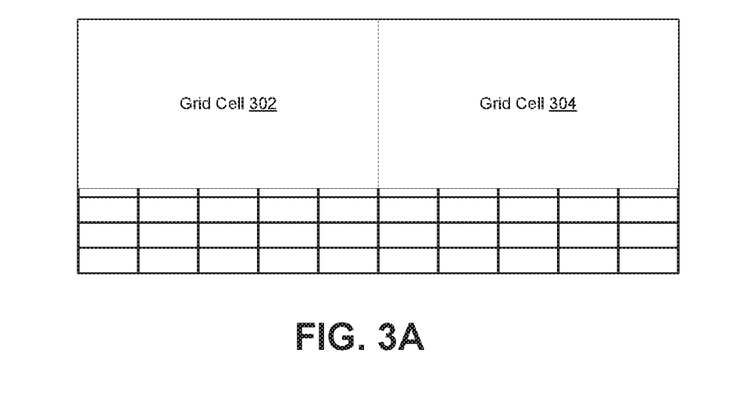
FIGS. 3A-C illustrate an example two column layout, three column layout, and masonry layout generated by a layout system using different templates, according to some embodiments.
Figure 3B:
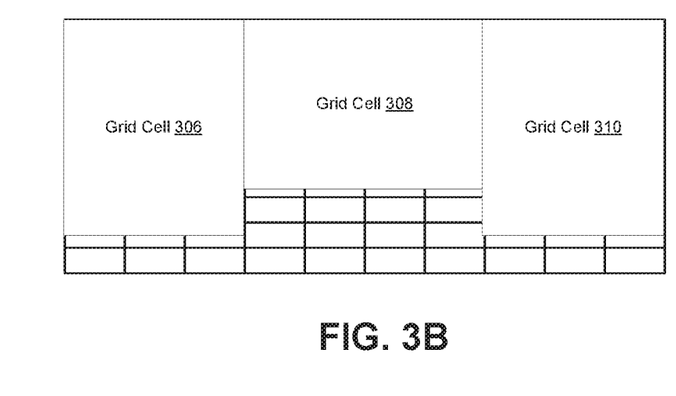
Figure 3C:
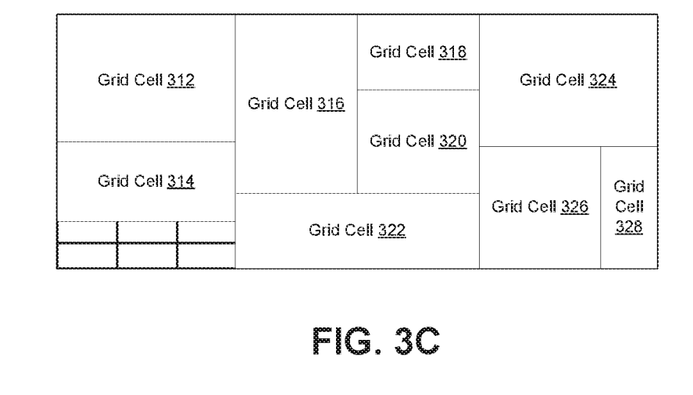

Template engine 108 can generate a layout type on top of a CSS grid layout using grid layout component 206 and a template 110. For example, template engine 108 can generate a two column layout, three column layout, or masonry layout on top of the CSS grid layout using grid layout component 206 and a template 110. FIGS. 3A-C illustrate an example two column layout, three column layout, and masonry layout generated by layout system 100 using different templates, according to some embodiments.

FIG. 3A illustrates a two column layout type. In FIG. 3A, the two columns are represented by grid cells 302 and 304. Grid cells 302 and 304 can include various types of content as would be appreciated by a person of ordinary skill in the art. Moreover, grid cells 302 and 304 can each include a layout type generated on top of a CSS grid layout using grid layout component 206 and a template 110. Grid cells 302 and 304 can use their respective layout type to arrange one or more page elements (e.g., grid cells) within themselves.

FIG. 3B illustrates a three column layout type. In FIG. 3B, the three columns are represented by grid cells 306, 308, and 310. Grid cells 306, 308, and 310 can include various types of content as would be appreciated by a person of ordinary skill in the art. Moreover, grid cells 306, 308, and 310 can each include a layout type generated on top of a CSS grid layout using grid layout component 206 and a template 110. Grid cells 306, 308, and 310 can use their respective layout type to arrange one or more page elements (e.g., grid cells) within themselves.

FIG. 3C illustrates a masonry layout type. A masonry layout type can be a grid layout based on columns. A masonry layout type may not have fixed height rows. Instead, a masonry layout type can place page elements in an optimal position based on available vertical space. In other words, a masonry layout type can optimize the use of space inside a page by reducing any unnecessary gaps. In FIG. 3C, the masonry layout type includes grid cells 312, 314, 316, 318, 320, 322, 324, 326, and 328. Each of these grid cells can include various types of content as would be appreciated by a person of ordinary skill in the art. Moreover, each of these grid cells can include a layout type generated on top of a CSS grid layout using grid layout component 206 and a template 110. Each of these grid cells can use their respective layout type to arrange one or more page elements (e.g., grid cells) within themselves.

In some embodiments, template engine 108 can use the view file to determine that a particular page element of the page is displayed using a template 110 based on a CSS grid layout. Template engine 108 can then download the corresponding template 110 from server 106. Template engine 108 can then create an instance of grid layout component 206 based on the template 110. For example, template engine 108 can adjust the predefined behavior of grid layout component 206 based on the settings specified in the template 110. This can enable the generation of different layout types on top of the CSS grid layout.

In some embodiments, the template 110 can specify multiple layout types on top of a CSS grid layout based on different breakpoints. An instance of grid layout component 206 based on the template 110 can then select a particular layout type for display on top of the CSS grid layout based on viewer 102 satisfying a particular breakpoint.

In some embodiments, the template 110 can be a subclass of grid layout component 206. The template 110 can therefore inherit the predefined behavior of grid layout component 206. The template 110 can also redefine the predefined behavior of grid layout component 206. For example, the template 110 can redefine the default number of rows and columns for the CSS grid layout. As would be appreciated by a person of ordinary skill in the art, template 110 can redefine various other attributes and behavior of grid layout component 206.

In some other embodiments, the template 110 can be a JavaScript Object Notation (JSON) file or a markup language file such as an XML file. Template engine 108 can create an instance of grid layout component 206 based on the settings specified in the template 110.

Grid component 202 can use the layout type generated by an instance of grid layout component 206 (e.g., an instance of grid layout component 206 based on a template 110) to arrange its one or more grid cells within the CSS grid layout. Grid component 202 can also display the content of each grid cell in the generated layout type.

In some embodiments, grid component 202 can display the content of each grid cell in the generated layout type based on its position and or size in the CSS grid layout. For example, grid component 202 can display a chart in a grid cell as an icon based the grid cell having a small size. Grid component 202 can determine the position and or size of each grid cell by querying the corresponding grid cell component 204.

In some embodiments, grid component 202 can dynamically attach or detach one or more add-on components 110 to the page or a page element assigned a CSS grid layout. An add-on component 110 can represent a separate component that adds functionality to the page or a page element assigned a CSS grid layout. For example, an add-on component 110 can add the ability to resize grid cells in the CSS grid layout. An add-on component 110 can add the ability to drag and drop grid cell in the CSS grid layout. An add-on component 110 can also enable element level queries of grid cells in the CSS grid layout. An element level query can involve applying responsive behavior on an element level (e.g., reacting to a width change of a specific document object model (DOM) element such as a grid cell in a CSS grid layout).

Grid component 202 can attach or detach the one or more add-on components 110 based on the assignment of a particular display mode to grid component 202. For example, grid component 202 can attach a resize add-on component 110, a drag and drop add-on component 110, or an element query add-on component 110 based the assignment of an "edit" display mode to grid component 202.

In some embodiments, grid component 202 can be assigned a particular display mode using the view file. In some other embodiments, grid component 202 can be assigned a particular display mode using a template 110.

In some embodiments, grid component 202 can determine whether a particular display mode is set after rendering the generated layout type with the one or more grid cells. In response to determining a particular display mode is set, grid component 202 can download one or more add-on components 110 associated with the particular display mode. Because the particular display mode can control whether to download and attach one or more add-on components 110, only layout types that need the functionality of the one or more add-on components 110 actually get it. This can reduce page load time and increase page responsiveness.

Grid component 202 can associate an event at a particular grid cell in the CSS grid layout with a particular set of functionality in an add-on component 110. For example, grid component 202 can associate a DOM event at a particular grid cell in the CSS grid layout with a particular set of functionality in an add-on component 110.

In some embodiments, grid component 202 can attach an add-on component 110 using a mutation observer pattern. For example, grid component 202 can pass its one or more grid cell components 204 representing grid cells into an attach function of the add-on component 110. The attach function can then bind one or more event types received at each grid cell component 204 to one or more respective event handlers in the add-on component 110. When an event (e.g., a DOM event) is received at a grid cell component 204, the event can then be dispatched to the appropriate event hander in the add-on component 110.

In some embodiments, the add-on component 110 can modify various properties of a grid cell component 204 in response to an event being received at the grid cell component 204. For example, an event handler of the add-on component 110 can use functions of the corresponding grid cell component 204 to change the corresponding grid cell's position and or size in the CSS grid layout. The add-on component 110 can then request grid layout component 206 reapply its generated layout type, as well as request the grid cell component 204 to rerender itself (e.g., to take into account the change in position and or size of the grid cell).

In some embodiments, template engine 108 can persist changes made to the generated layout type by a user. For example, a user may resize a grid cell in the CSS grid layout using a resize add-on component 110. In response, the resize add-on component 110 can update the size information in the corresponding grid cell component 204. Similarly, a user may drag and drop a grid cell in the CSS grid layout to a new location in the CSS grid layout using a drop and drop add-on component 110. In response, the drop and drop add-on component 110 can update the position information in the corresponding grid cell component 204.

In some embodiments, in response to a change made to the generated layout type, template engine 108 can store the change in a file. In some other embodiments, template engine 108 can periodically store the state of the generated layout in a file. Template engine 108 can store the changes in the file using attribute value pairs. For example, template engine 108 can store the changes in JSON file. As would be appreciated by a person of ordinary skill in the art, template engine 108 can store the changes in various other data formats.

Template engine 108 can upload the file to server 106 to persist the changes. For example, template engine 108 can upload the changes to user state 114 at server 106. Template engine 108 can also upload the file along with information about the user who made the changes to the generated layout type. Server 106 can then store the persisted changes along with the information about the user who made the changes to the generated layout type. This can allow layout personalization.

Template engine 108 can restore the changes made to the generated layout type by a user from server 106 at a later time. For example, template engine 108 can download the persisted changes from server 106 during a later instantiation of grid component 202, grid cell components 204, and grid layout 206. Template engine 108 can download the persisted changes as a JSON file. Template engine 108 can download the relevant persisted changes based on the current user. After downloading the persisted changes, template engine 108 can perform a data binding operation that binds attributes in grid component 202, grid cell components 204, and grid layout 206 to the corresponding values in downloaded persisted changes. Template engine 108 can then display content using the generated layout that includes changes previously made to the layout by the user.

Figure 4:
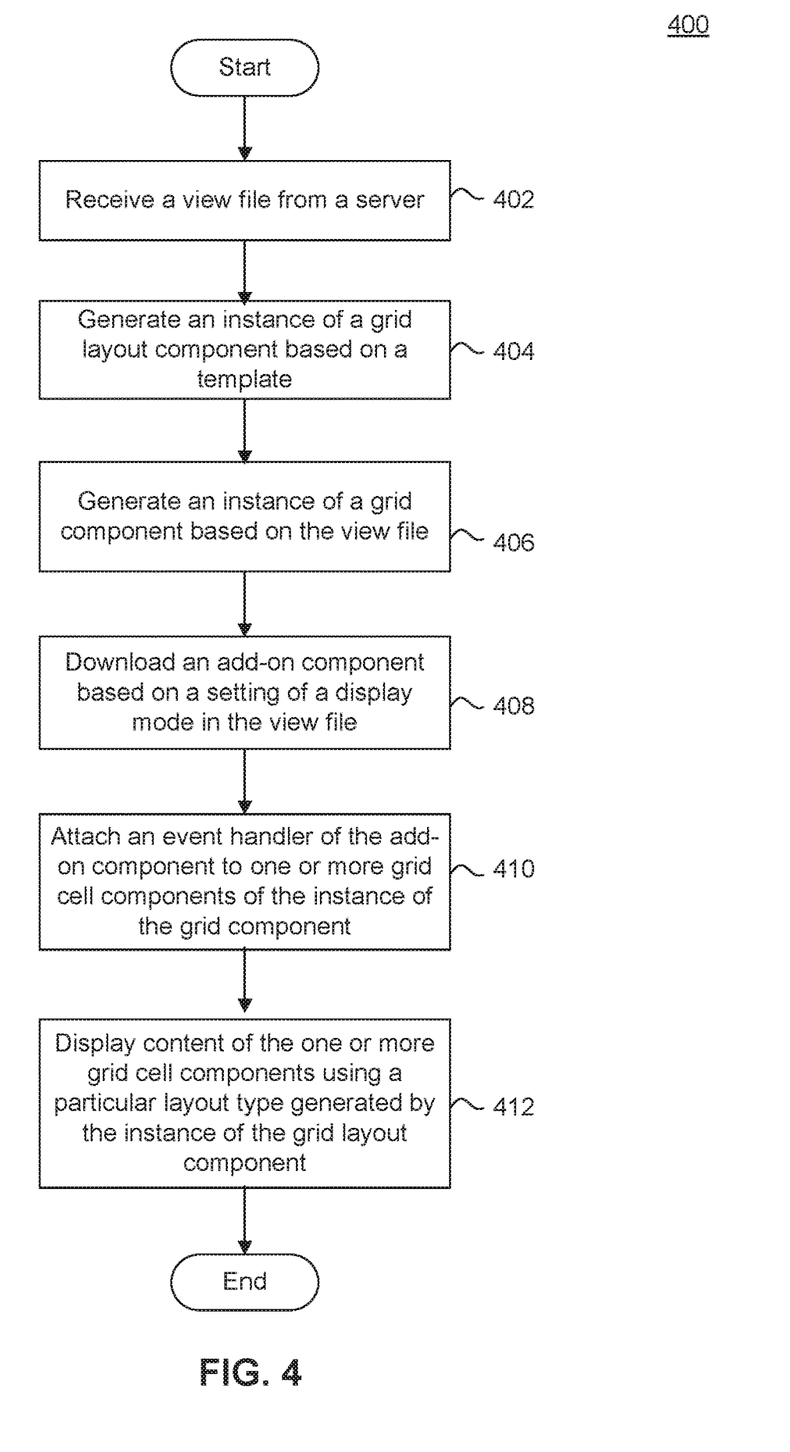
FIG. 4 is a flowchart illustrating adding a template engine to a CSS grid layout to display content using different templates, according to some embodiments.

FIG. 4 is a flowchart for a method 400 for adding a template engine to a CSS grid layout to display content using different templates, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 2. However, method 400 is not limited to those example embodiments.

In 402, viewer 102 receives a view file from server 106. The view file can specify that a page element is displayed using a particular layout type using a CSS grid layout based on a template 110. The view file can specify one or more grid cells in the particular layout type. The view file can specify the sizes and or positions of the one or more grid cells in the particular layout type. The view file can further indicate a display mode for the page element being displayed using the particular layout type. The display mode can indicate whether to attach one or more add-on components 112 to the page element being displayed using the particular layout type.

In 404, viewer 102 uses template engine 108 to generate an instance of grid layout component 206 based on the template 110. Template engine 108 can optionally download the template 110 from server 106. The instantiated grid layout component 206 defines a particular layout type using a CSS grid layout based on the template 110.

In 406, viewer 102 uses template engine 108 to generate an instance of grid component 202 based on the view file. The instantiated grid component 202 generates a set of grid cell components 204 based on the view file. Each grid cell component 204 can represent a grid cell in the particular layout type of the instantiated grid layout component 206. The instantiated grid component 202 causes each grid cell component 204 to be mapped to one or more rows and one or more columns in the CSS grid layout of the grid layout component 206. This enables a grid cell in the particular layout type to be addressable via an event.

In 408, the instance of grid component 202 optionally downloads an add-on component 112 from server 106 based on a setting of a display mode in the view file.

In 410, the instance of grid component 202 optionally attaches an event handler of the add-on component 112 to one or more grid cell components 204 in the set of grid cell components 204.

In 412, the instance of the grid component 202 displays content of the set of grid cell components using the particular layout type generated by grid layout component 206.

Figure 5:
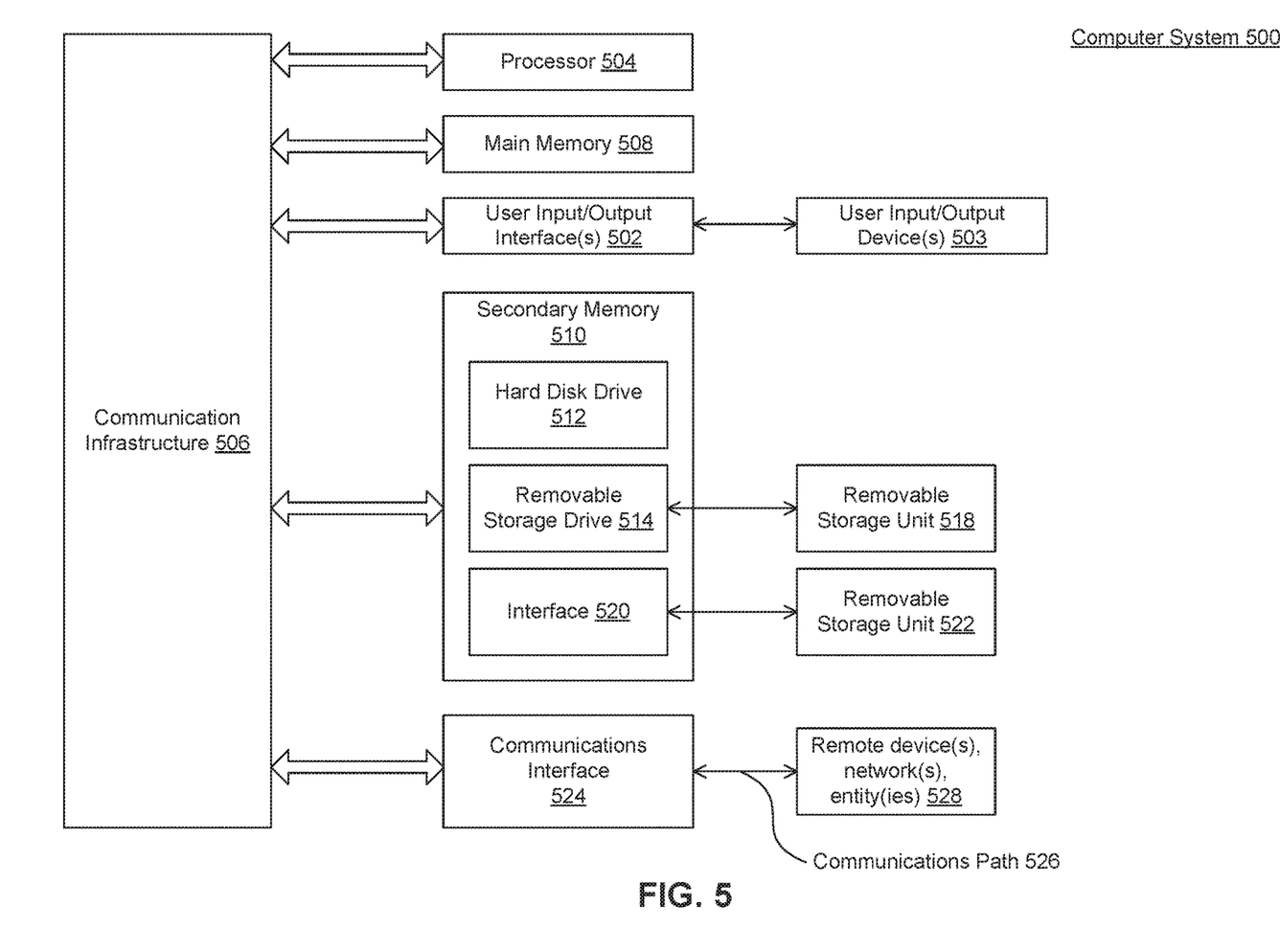
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving, by at least one processor using a web browser, a page, a template engine, and a view file from a server; and
   executing, by the at least one processor using the web browser, the template engine, wherein the executing the template engine comprises:
      identifying, by the at least one processor using the template engine, a page element of the page that uses a cascading style sheet (CSS) grid layout based on the view file;
      generating, by at least one processor using the template engine, a grid layout component defining a first layout type of the page element using a first template specified by the view file for the page element, and the CSS grid layout corresponding to the page element, wherein the generating the grid layout component comprises generating a grid component comprising a set of grid cell components, wherein each grid cell component in the set of grid of cell components is mapped to a corresponding grid cell in the CSS grid layout corresponding to the page element based on the first template, and each grid cell component in the set of grid of cell components enables the corresponding grid cell in the CSS grid layout corresponding to the page element to be addressable via an event based on the corresponding grid cell component storing a mapping to one or more rows and one or more columns in the CSS grid layout corresponding to the page element;
      displaying, by the at least one processor using the template engine, the page element according to the first layout type;
      detecting, by the at least one processor using the template engine, a change in a characteristic of a viewer that satisfies a breakpoint specified in the view file for the page element;
      loading, by the at least one processor using the template engine, a second template specified by the view file for the page element based on the detected change, wherein the second template defines a second layout type of the page element; and
      redefining, by the at least one processor using the generated grid layout component, a portion of the generated set of grid cell components to different corresponding grid cells in the CSS grid layout corresponding to the page element using the second template thereby rendering the page element according to the second layout type.

2. The method of claim 1, further comprising:
   determining, by the at least one processor using the grid component, a display mode based on the view file;
   creating, by the at least one processor using the grid component, an add-on component based on the display mode; and
   attaching, by the at least one processor using the grid component, an event handler of the add-on component to a grid cell component in the set of grid cell components, wherein the event handler is triggered in response to an event at the grid cell component.

3. The method of claim 2, further comprising:
   receiving, by the at least one processor at the event handler of the add-on component, the event;
   determining, by the at least one processor at the event handler of the add-on component, a change in the corresponding grid cell component;

modifying, by the at least one processor at the event handler of the add-on component, the corresponding grid cell component based on the change; and displaying, by the at least one processor using the grid component, the content of the set of grid cell components using the layout type based on the change.

4. The method of claim 1, wherein each grid cell component in the set of grid cell components is configured to display content of the corresponding grid cell in the CSS grid layout.

5. The method of claim 1, wherein the generating the grid layout component further comprises:

defining, by the at least one processor, a number of rows and columns of the CSS grid layout based on the first template.

6. The method of claim 1, wherein the CSS grid layout conforms to a CSS standard.

7. The method of claim 1, further comprising:

determining, by the at least one processor using the grid component, a display mode in response to loading the second template;

creating, by the at least one processor using the grid component, an add-on component based on the display mode; and attaching, by the at least one processor using the grid component, an event handler of the add-on component to a grid cell component in the set of grid cell components, wherein the event handler is triggered in response to an event at the grid cell component.

8. The method of claim 1, wherein each grid cell component in the set of grid of cell components is a scripting object.

9. The method of claim 1, wherein the view file is an Extensible Markup Language (XML) file, and the first template is a XML file or a scripting object notation file.

10. The method of claim 1, wherein the loading the second template further comprises:

downloading, by the at least one processor using the template engine, the second template from the server.

11. A system, comprising:

a memory; and at least one processor coupled to the memory and configured to:

receive, using a web browser, a page, a template engine, and a view file from a server; and execute, using the web browser, the template engine, wherein to execute the template engine the at least one processor is further configured to:

identify, using the template engine, a page element of the page that uses a cascading style sheet (CSS) grid layout based on the view file;

generate, using the template engine, a grid layout component defining a first layout type of the page element using a first template specified by the view file for the page element, and the CSS grid layout corresponding to the page element, wherein the generating the grid layout component comprises generating a grid component comprising a set of grid cell components, wherein each grid cell component in the set of grid of cell components is mapped to a corresponding grid cell in the CSS grid layout corresponding to the page element based on the first template, and each grid cell component in the set of grid of cell components enables the corresponding grid cell in the CSS grid layout corresponding to the page element to be addressable via an event based on the corresponding grid cell component storing a mapping to one or more rows and one or more columns in the CSS grid layout corresponding to the page element;

display, using the template engine, the page element according to the first layout type;

detect, using the template engine, a change in a characteristic of a viewer that satisfies a breakpoint specified in the view file for the page element;

load, using the template engine, a second template specified by the view file for the page element based on the detected change, wherein the second template defines a second layout type of the page element; and redefine, using the generated grid layout component, a portion of the generated set of grid cell components to different corresponding grid cells in the CSS grid layout corresponding to the page element using the second template thereby rendering the page element according to the second layout type.

12. The system of claim 11, the at least one processor further configured to:

determine, using the grid component, a display mode based on the view file;

create, using the grid component, an add-on component based on the display mode; and attach, using the grid component, an event handler of the add-on component to a grid cell component in the set of grid cell components, wherein the event handler is triggered in response to an event at the grid cell component.

13. The system of claim 12, the at least one processor further configured to:

receive, at the event handler of the add-on component, the event;

determine, at the event handler of the add-on component, a change in the corresponding grid cell component;

modify, at the event handler of the add-on component, the corresponding grid cell component based on the change; and display, using the grid component, the content of the set of grid cell components using the layout type based on the change.

14. The system of claim 11, wherein each grid cell component in the set of grid cell components is configured to display content of the corresponding grid cell in the CSS grid layout.

15. The system of claim 11, wherein to generate the grid layout component the at least one processor is further configured to:

define a number of rows and columns of the CSS grid layout based on the first template.

16. The system of claim 11, the at least one processor further configured to:

determine, using the grid component, a display mode in response to loading the second template;

create, using the grid component, an add-on component based on the display mode; and attach, using the grid component, an event handler of the add-on component to a grid cell component in the set of grid cell components, wherein the event handler is triggered in response to an event at the grid cell component.

17. A non-transitory computer-readable medium having instructions stored thereon that, when executed by at least one computing device, causes the at least one computing device to perform operations comprising:

receiving, using a web browser, a page, a template engine, and a view file from a server; and  executing, using the web browser, the template engine, wherein the executing the template engine comprises:

identifying, using the template engine, a page element of the page that uses a cascading style sheet (CSS) grid layout based on the view file;

generating, using the template engine, a grid layout component defining a first layout type of the page element using a first template specified by the view file for the page element, and the CSS grid layout corresponding to the page element, wherein the generating the grid layout component comprises generating a grid component comprising a set of grid cell components, wherein each grid cell component in the set of grid of cell components is mapped to a corresponding grid cell in the CSS grid layout corresponding to the page element based on the first template, and each grid cell component in the set of grid of cell components enables the corresponding grid cell in the CSS grid layout corresponding to the page element to be addressable via an event based on the corresponding grid cell component storing a mapping to one or more rows and one or more columns in the CSS grid layout corresponding to the page element;

displaying, using the template engine, the page element according to the first layout type;

detecting, using the template engine, a change in a characteristic of a viewer that satisfies a breakpoint specified in the view file for the page element;

loading, using the template engine, a second template specified by the view file for the page element based on the detected change, wherein the second template defines a second layout type of the page element; and   redefining, using the generated grid layout component, a portion of the generated set of grid cell components to different corresponding grid cells in the CSS grid layout corresponding to the page element using the second template thereby rendering the page element according to the second layout type.

18. The non-transitory computer-readable medium of claim 17, the operations further comprising:

determining, using the grid component, a display mode based on the view file;

creating, using the grid component, an add-on component based on the display mode; and  attaching, using the grid component, an event handler of the add-on component to a grid cell component in the set of grid cell components, wherein the event handler is triggered in response to an event at the grid cell component.

19. The non-transitory computer-readable medium of claim 18, the operations further comprising:

receiving, at the event handler of the add-on component, the event;

determining, at the event handler of the add-on component, a change in the corresponding grid cell component;

modifying, at the event handler of the add-on component, the corresponding grid cell component based on the change; and  displaying, using the grid component, the content of the set of grid cell components using the layout type based on the change.

20. The non-transitory computer-readable medium of claim 17, wherein each grid cell component in the set of grid cell components is configured to display content of the corresponding grid cell in the CSS grid layout.

\* \* \* \* \*